(12) United States Patent
Yoshida

(10) Patent No.: US 7,126,684 B2
(45) Date of Patent: Oct. 24, 2006

(54) SPECTROSCOPE CONFOCAL OPTICAL SYSTEM USING THE SAME, AND SCANNING MICROSCOPE

(75) Inventor: Takehiro Yoshida, Tokyo (JP)

(73) Assignee: Olympus Corporation, Tokyo (JP)

( * ) Notice: Subject to any disclaimer, the term of this patent is extended or adjusted under 35 U.S.C. 154(b) by 427 days.

(21) Appl. No.: 10/679,508

(22) Filed: Oct. 7, 2003

(65) Prior Publication Data
US 2004/0207841 A1   Oct. 21, 2004

(30) Foreign Application Priority Data
Oct. 9, 2002   (JP) .............................. 2002-296329

(51) Int. Cl.
*G01J 3/28* (2006.01)
(52) U.S. Cl. ...................... 356/326; 356/328
(58) Field of Classification Search ............... 356/328, 356/334, 326
See application file for complete search history.

(56) References Cited

U.S. PATENT DOCUMENTS 6,081,332 A * 6/2000 Kojima ....................... 356/334
6,555,811 B1 * 4/2003 Amos ......................... 250/234

\* cited by examiner

*Primary Examiner*—Hwa (Andrew) Lee
*Assistant Examiner*—Marissa J. Detschel
(74) *Attorney, Agent, or Firm*—Pillsbury Winthrop Shaw Pittman LLP

(57) ABSTRACT

A spectroscope is provided with a point light source which emits a dispersed light having a plurality of wavelengths, a first optical system which collimates the dispersed light which is emitted from the point light source into an approximate parallel light flux, a dispersing element which disperses the approximate parallel light flux, and a second optical system for condensing the dispersed light flux near a focal plane. Aberrations for a plurality of wavelengths of an off-axial light flux are compensated in the second optical system. By doing this, it is possible to provide a spectroscope which has a high wavelength resolution.

14 Claims, 7 Drawing Sheets

DIFFRACTION GRATING →

← DIFFRACTION GRATING

SPECTROSCOPE CONFOCAL OPTICAL SYSTEM USING THE SAME, AND SCANNING MICROSCOPE

Priority is claimed on Japanese Patent Application No. 2002-296329, filed Oct. 9, 2002, the content of which is incorporated herein by reference.

BACKGROUND OF THE INVENTION

1. Field of the Invention

The present invention relates to a spectroscope, a confocal optical system, using the same, and a scanning microscope.

2. Description of Related Art

For a conventional spectroscope, there has been a microscope which is disclosed in Japanese Unexamined Patent Application, First Publication No. Hei 11-183249 which is shown in FIG. 10. According to FIG. 10, a dispersed light which is emitted from an optical fiber is collimated by a first lens in the spectroscope. The parallel light is diffracted by a diffraction grating; thus, a light which has a specific wavelength in the diffracted parallel light is introduced to a second lens. After that, a light which is condensed by the second lens-passes through an output slit so as to be detected. Here, it is possible to change the wavelength of the detected light by rotating the diffraction grating (for example, see paragraphs 0021 to 0028 and FIG. 1 in Japanese Unexamined Patent Application, First Publication No. Hei 11-183249).

Also, for another conventional spectroscope, there has been a spectrum selecting device which is disclosed in Japanese Unexamined Patent Application, First Publication No. 2002-122787 which is shown in FIG. 11. The spectrum selecting device is with a section for selecting a predetermined spectrum area such that a light of which spectrum is divided and a detecting device can be variably positioned relatively (for example, see paragraphs 0006 to 0028 and FIG. 1 in Japanese Unexamined Patent Application, First Publication No. 2002-122787).

SUMMARY OF THE INVENTION

The present invention proposes following sections.

A spectroscope of the present invention comprises an entrance aperture member for passing a light, a first optical system which collimates a dispersing light which is emitted from the entrance aperture member into an approximate collimated light flux, a dispersing element which is disposed so as to freely rotate for dispersing the approximate collimated light flux, a second optical system for condensing the light flux which is dispersed by the dispersing element near a focal plane, a variable-width slit having a variable slit-width which is disposed near the focal plane, and an optical detector for detecting a light flux which passes the variable-width slit among the dispersed light flux according to the slit-width of the variable-width slit or the rotation of the dispersing element.

In the spectroscope of the present invention, it is preferable that aberrations for a plurality of wavelengths of an off-axial light flux are compensated in the second optical system.

Also, in the spectroscope of the present invention, it is preferable that the second optical system comprises a plurality of lenses.

Also, in the spectroscope of the present invention, it is preferable that the second optical system comprises at least a lens having a positive focal length and at least a lens having a negative focal length, and a relationship R1 such as $v_+ - v_- > 25$ is effective under condition that $v_+$ indicates an Abbe number for the lens having a positive focal length and $v_-$ indicates an Abbe number for the lens having a negative focal length.

Also, in the spectroscope of the present invention, it is preferable that wherein the dispersing element is a reflective plane grating satisfies a relationship R2 such as $$0 < \frac{2.44\cos\alpha}{NmD} < 0.04$$

under condition that a indicates an incident angle of a light flux which is incident to the reflective plane grating, N indicates grooves per a unit length of the reflective plane grating, m indicates a diffraction order, and D indicates a diameter of the light flux which passes through the first optical system.

Also, in the spectroscope of the present invention, it is preferable that the first optical system comprises a first lens group having a negative focal length and a second lens group having a positive focal length.

Also, in the spectroscope of the present invention, it is preferable that the dispersing element is a reflective plane grating, and the optical detector detects a light flux having a desirable wavelength selectively by rotating the reflective plane grating and changing the width of the slit of the variable-width slit.

Also, in the spectroscope of the present invention, it is preferable that the optical detector detects a light flux having a desirable wavelength selectively by changing the slit width of the variable-width slit under condition that a prism is used for a fixed dispersing element.

Also, a laser scanning microscope of the present invention comprises a light source, an objective lens which condenses a light which is emitted from the light source on a sample, a light condensing optical system which condenses a light which is reflected by the sample or a light which is emitted from the sample, an aperture member which is disposed at a focal point in the light condensing optical system so as to be optically conjugate with the sample, a first optical system which collimates the dispersed light which is emitted from the aperture member into an approximate parallel light, a dispersing element which is disposed so as to freely rotate for dispersing the approximate parallel light flux, a second optical system which condenses the light flux which is dispersed by the dispersing element near the focal plane, a variable-width slit which is disposed near the focal plane of which slit width is variable, and an optical detector which detects the light flux which passes through the variable-width slit among the dispersed light fluxes according to the width of the slit or the rotation of the dispersing element.

Also, in the laser scanning microscope of the present invention, it is preferable that the aperture member has an aperture which is formed as a pinhole.

Also, in the laser scanning microscope of the present invention, it is preferable that aberrations for a plurality of wavelengths of an off-axial light flux are compensated in the second optical system.

Also, in the laser scanning microscope of the present invention, it is preferable that the second optical system comprises a plurality of lenses.

Also, in the laser scanning microscope of the present invention, it is preferable that the second optical system comprises at least a lens having a positive focal length and at least a lens having a negative focal length, and a relationship such as $v_+ - v_- > 25$ is effective under condition that $v_+$ indicates an Abbe number for the lens having a positive focal length and $v_-$ indicates an Abbe number for the lens having a negative focal length.

Also, in the laser scanning microscope of the present invention, it is preferable that the dispersing element is a reflective plane grating satisfies a relationship such as $$0 < \frac{2.44\cos\alpha}{NmD} < 0.04$$

under condition that $\alpha$ indicates an incident angle of a light flux which is incident to the reflective plane grating, N indicates grooves per a unit length of the reflective plane grating, m indicates a diffraction order, and D indicates a diameter of the light flux which passes through the first optical system.

Also, in the laser scanning microscope of the present invention, it is preferable that the first optical system comprises a first lens group having a negative focal length and a second lens group having a positive focal length.

Also, in the laser scanning microscope of the present invention, it is preferable that the dispersing element is a reflective plane grating, the optical detector detects a light flux having a desirable wavelength selectively by rotating the reflective plane grating and changing the width of the slit of the variable-width slit.

Also, in the laser scanning microscope of the present invention, it is preferable that the optical detector detects a light flux having a desirable wavelength selectively by changing the slit width of the variable-width slit under condition that a prism is used for a fixed dispersing element.

Also, in the laser scanning microscope of the present invention, it is preferable that a single mode fiber is disposed so as to have an incident end of the single mode fiber is disposed instead of the aperture member.

According to the present invention, it is preferable that a confocal optical system comprises a light source, an objective lens which condenses a light which is emitted from the light source on a sample, a light condensing optical system which condenses a light which is reflected by the sample or a light which is emitted from the sample, an aperture member which is disposed at a focal point in the light condensing optical system so as to be optically conjugate with the sample, a first optical system which collimates the dispersed light which is emitted from the aperture member into an approximate parallel light, a dispersing element which is disposed so as to freely rotate for dispersing the approximate parallel light flux, a second optical system which condenses the light flux which is dispersed by the dispersing element near the focal plane, a variable-width slit which is disposed near the focal plane of which slit width is variable, and an optical detector which detects the light flux which passes through the variable-width slit among the dispersed light fluxes according to the width of the slit or the rotation of the dispersing element.

Also, in the scanning microscope of the present invention, it is preferable that a relationship R3 such as $\Delta\lambda < 20$ nm is effective under condition that $\Delta\lambda$ indicates a wavelength resolution for separating a light having a wavelength $\lambda$ from a light having a wavelength ($\lambda + \Delta\lambda$).

Also, in the laser scanning microscope of the present invention, it is preferable that a relationship R4 such as $\Delta\lambda < 5$ nm is effective under condition that $\Delta\lambda$ indicates a wavelength resolution for separating a light having a wavelength $\lambda$ from a light having a wavelength ($\lambda + \Delta\lambda$).

BRIEF DESCRIPTION OF THE DRAWINGS

In FIG. 12A, a case is shown in which a wavelength resolution is desirable, and in FIG. 12B, a case is shown in which a wavelength resolution is not desirable.

DETAILED DESCRIPTION OF THE INVENTION

A spectroscope, a confocal optical system using the same, and a scanning microscope according to the embodiments of the present invention are explained in detail with reference to FIGS. 1 to 10 below.

Figure 1:
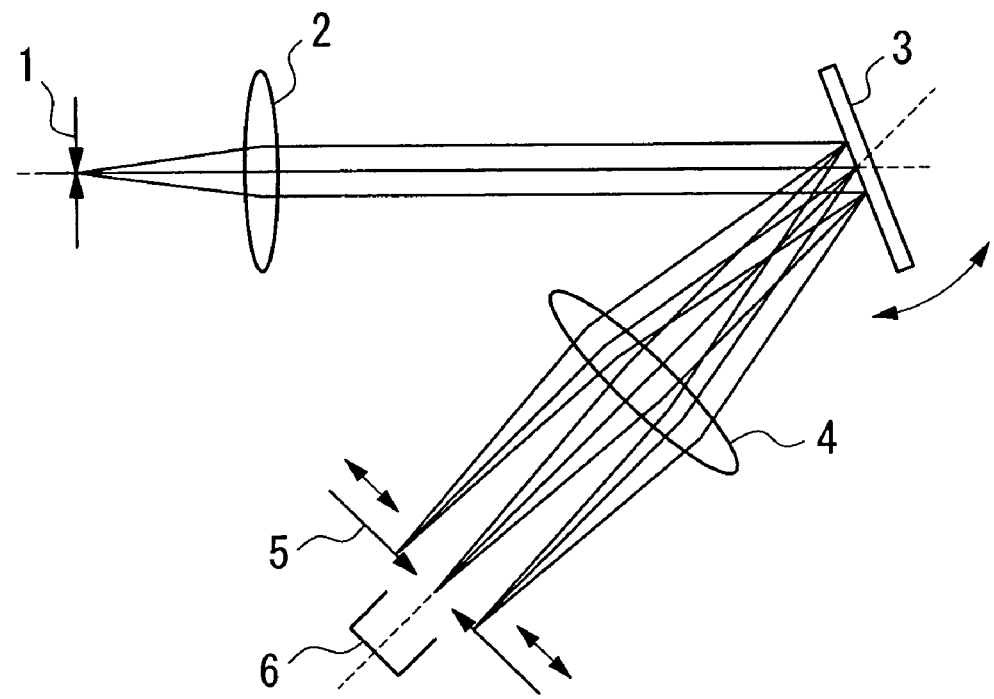
FIG. 1 shows a general structure for a spectroscope according to a first embodiment of the present invention.

As shown in FIG. 1, dispersing device according to the embodiments of the present invention comprises a pinhole 1 as an entrance aperture, a first optical system 2, a plane diffraction grating 3, a second optical system 4, a variable-width slit 5, and optical detecto 6.

A dispersed light which passes through the pinhole 1 is converted into an approximate parallel light by the first optical system 2 so as to be incident to the plane diffraction grating 3. Here, a diameter of the pinhole depends on a numerical aperture (NA) and a wavelength of the dispersed light which passes through the pinhole 1 such that it is possible to understand that the dispersed light flux which passes through the pinhole 1 be dispersed substantially from a point light source. Here, numerical data for the first optical system 2 is specified on a TABLE 1 (surface numbers 2 and 3). A shape which is formed by these numerical data is specified in FIG. 4.

A groove is formed on the plane diffraction grating 3 so as to freely rotate around an axis which is approximately parallel with the groove. By doing this, it is possible to select a wavelength $\lambda_0$ which is parallel with an optical axis in the second optical system 4. The light flux having an wavelength $\lambda_0$ which is diffracted and dispersed by the plane diffraction grating 3 is incident to the second optical system 4 which is maintained to be parallel with the optical axis of the second optical system 4. The plane diffraction grating 3 is disposed near a front focal point in the second optical system 4.

Figure 5:
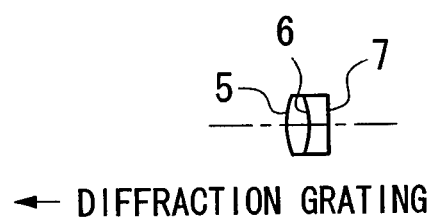
FIG. 5 is a cross section for a second optical system according to a first embodiment of the present invention.
Figure 6:
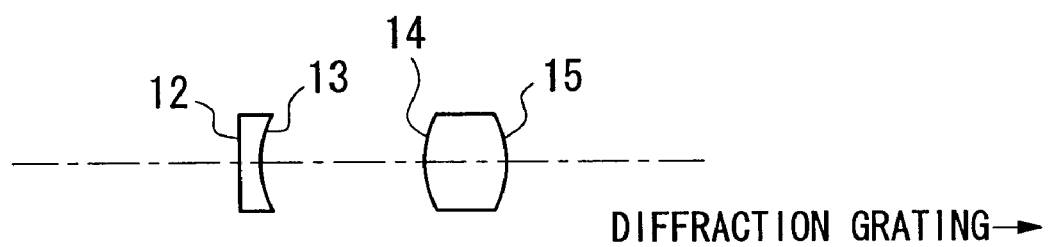
FIG. 6 is a cross section for a first optical system according to a second embodiment of the present invention.

The light flux for each wavelength which is incident to the second optical system 4 is emitted as an approximate telecentric light flux. Consequently, the light flux for each wavelength is condensed in a surface which is vertical to the optical axis of the second optical system 4 near a rear focal point in the second optical system 4. Also, a variable-width slit 5 is disposed in the light condensing position. An optical detector 6 is disposed there backward. Here, a sufficiently desirable focus is realized in the second optical system 4 according to the present embodiment in which a chromatic aberration is compensated particularly desirably. More specific example is shown in FIG. 5. As shown in FIG. 5, the second optical system 4 comprises a plurality of lenses (here, in this case, two pieces of lens). More specifically, the second optical system 4 comprises a negative lens and a positive lens which are cemented together. By doing this, a light condensing spot for each wavelength which is formed at the slit is sufficiently small. Therefore, the spot for the $\lambda_1$ and the spot for the $(\lambda-\Delta\lambda)$ do not overlap if the $\Delta\lambda$ is small; thus, it is possible to separate these spots from each other. Here, the numerical data for the second optical system 4 is specified in a TABLE 1 (surface numbers 5 to 7).

The width of the variable-width slit 5 is adjusted such that the spot for $\lambda_1$ passes through the slit and the spot for the $(\lambda_1 \cdot \Delta\lambda)$ is blocked by the slit. Similarly, the position of the slit is determined on the other side such that the spot for the $\lambda_2$ passes through and the spot for $(\lambda_2+\Delta\lambda)$ is blocked. Therefore, under such a condition, a range of the wavelength which is detected by the optical detector 6 covers $\lambda_1$ and $\lambda_2$. By doing this, it is possible to determine the range of the adjustable wavelength desirably by adjusting the rotation angle of the plane diffraction grating 3 and the width of the variable-width slit 5.

Also, according to FIG. 1, the width of the variable-width slit 5 is set by moving slit members respectively which are disposed symmetrically for the optical detector 6. However, it may be acceptable if only either one of the slit member is moved and another one of the slit member is fixed.

Also, if a prism is used for the dispersing member, it is more preferable that a wavelength bandwidth should be incident into the optical detector 6 selectively such taht a variable width slit can be adjusted only by adjusting a length of a slit width of the variable width slit under condition that a prism is used in place of the plane diffraction grating 3 so as not to be rotated.

Furthermore, various shape such as a round shape, a triangle shape, and a rectangular shape is acceptable for the pinhole 1 according to usage condition.

Lens data according to the first embodiment of the present invention are shown in TABLE 1 below.

TABLE 1

| Surface Number | Radii of Curvature | Intervals | $n_d$ | $V_d$ |
|---|---|---|---|---|
| 1 | ∞ | 133 | | |
| 2 | ∞ | 3.1 | 1.5168 | 67.166 |

TABLE 1-continued

| Surface Number | Radii of Curvature | Intervals | $n_d$ | $V_d$ |
|---|---|---|---|---|
| 3 | −70.027 | * | | |
| 4 (Reflecting Diffracting Surface) | ∞ | 24.1 | | |
| 5 | 16.53 | 2.63 | 1.5638 | 60.798 |
| 6 | −10.88 | 2.5 | 1.6726 | 32.209 |
| 7 | −39.8 | 22.6 | | |
| 8 (Variable-Width Slit Surface) | ∞ | | | |

"*" indicates any arbitrary distance

In the present embodiment, the NA for the dispersed light which passes through the pinhole 1 is 0.011. A diameter D for an approximate parallel light flux which is made after transmitting through the first optical system is f 3 mm because the focal length of the first optical system is 135 mm. Furthermore, the grooves on the diffracting surface is 600 grooves/mm. Also, an angle which is made by the optical axis of the first optical system and the optical axis of the second optical system is 40 degrees; thus, the direction of the grooves on the diffraction grating is orthogonal to both of the optical axes.

Under these conditions, relationships the rotation angle (incident angle of the light to the diffracting surface) of the diffraction grating and the wavelength $\lambda_0$ which is directed to the optical axis of the second optical system are specified in TABLE 2. Also, relationships between the diameter (here, calculation is performed under condition that the diameter of the spot indicates an area which contains 90% of wave optics energy) of the spot which is condensed by the second optical system while changing the wavelength $\lambda_0$ and shifted amount of the spots under condition that the wavelength alters by 1 nm are shown a TABLE 3.

TABLE 2

| Rotation Angle (Degree) | Wavelength $\lambda_0$ (nm) |
|---|---|
| 7 | 704.62 |
| 8 | 651.24 |
| 9 | 597.67 |
| 10 | 543.92 |
| 11 | 490 |
| 12 | 435.93 |
| 13 | 381.27 |
| 14 | 327.42 |

TABLE 3

| $\lambda_0$ (nm) | Spot Diameter (μm) | | | Shifted Amount of Spot/1 nm (μm) |
|---|---|---|---|---|
| | $\lambda_0 - 50$ | $\lambda_0$ | $\lambda_0 + 50$ | |
| 380 | | 16.8 | 16.1 | 16.9 |
| 420 | 16.8 | 14.8 | 17.5 | 16.9 |
| 460 | 14.7 | 16.1 | 18.4 | 17 |
| 500 | 16.9 | 17.7 | 19.6 | 17.1 |
| 540 | 17.8 | 19.8 | 21.4 | 17.3 |
| 580 | 18.8 | 22.4 | 23.6 | 17.4 |
| 620 | 20.3 | 25.3 | 26.2 | 17.5 |
| 660 | 22.3 | 28.7 | | 17.7 |
| 680 | 23.5 | 30.3 | | |

Figure 2:
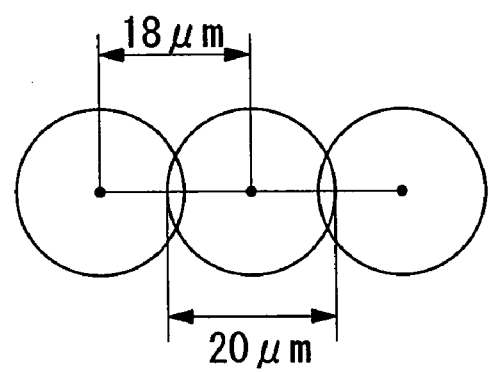
FIG. 2 is a diagram which shows a plurality of shifted spots having different wavelengths.

In FIG. 2, it is observed that the light fluxes having the spots of wavelengths such as $(\lambda_0-1)$, $\lambda_0$, and $(\lambda_0+1)$ nm and 20 μm diameters are disposed so as to be shifted by 18 μm respectively. According to such a disposition, it is understood that the light flux having the wavelength $\lambda_0$ rim and the light flux having the wavelength $(\lambda_0+1)$ nm cannot be separated because the spots overlap each other. In contrast, it is understood that the light flux having the wavelength $(\lambda_0-1)$ nm and the light flux having the wavelength $(\lambda_0+1)$ nm can be separated because the spots do not overlap each other. Therefore, it is understood that the wavelength resolution $\Delta\lambda$ under such a condition is greater than 1 nm but smaller than 2 nm.

Also, it is understood that the present embodiment satisfies a following relationship R6 such as $$0 < \frac{2.44\cos\alpha}{NmD} = \frac{2.44 \times 0.9877}{600 \times 1 \times 3} = 1.33 \times 10^{-3} < 0.04$$

under condition that an incident angle a of the light flux which is incident to the plane diffraction grating 3 is 9°, amount N of gratings per unit length of the plane diffraction grating 3 is 600/mm, a diffraction order m is 1 (one), and a diameter D for the light flux which transmits through the first optical system is 3 mm.

Here, the above relationship is effective under condition that there is not chromatic aberrations in the optical system. However, it should be understood that the chromatic aberrations may occur very commonly. Therefore, while taking such chromatic aberrations into account, it is possible to separate the wavelength $\lambda_1$ and the wavelength $(\lambda_1-\Delta\lambda)$ if a relationship R7 below such as $$d_1 < \frac{Nmf}{\cos\beta}\Delta\lambda$$

is satisfied under condition that $d_1$ indicates a condensing spot diameter of the wavelength $\lambda 1$ which is formed at the slit after the light flux passes through the second optical system. (Here, calculation is performed under condition that the diameter of the spot indicates an area which contains 90% of wave optics energy.)

Here, "$\Delta\lambda$" indicates a wavelength resolution for separating a light having a wavelength $\lambda$ from a light having a wavelength $(\lambda+\Delta\lambda)$. "β" indicates an emitting angle of the light flux which is incident to the reflective plane diffraction grating. "N" indicates grooves per a unit length of the reflective plane diffraction grating. "m" indicates a diffraction order. "f" indicates a focal length of the second optical system.

Also, if the second optical system is formed which can satisfy the above relationship R7 under condition that the wavelength resolution $\Delta\lambda$ is determined in advance, it is possible to realize a spectroscope having the wave resolution $\Delta\lambda$. Furthermore, it is possible to separate the light having the wavelength $\lambda_2$ and the light having the wavelength $(\lambda_2-\Delta\lambda)$ under condition that $d_2$ indicates the condensing spot diameter for the wavelength $\lambda_2$, and $d_1$ in the relationship R7 is replaced by $d_2$. Here, the cemented lens in fifth-seventh surface in TABLE 1 which forms the second optical system satisfies the relationship R1.

Next, a second embodiment of the present invention is explained. A spectroscope in the second embodiment is formed in which the first optical system (surface numbers 2 to 3 in TABLE 1) in the first embodiment is replaced by lenses below shown in a TABLE 4. That is, in the present embodiment, the first optical system is formed by a first lens group having a negative focal length and a second lens group having a positive focal length; therefore, the first optical system is a telephoto optical system in which a distance between a point light source and the last surface of the lens is shorter than the focal length. Therefore, according to the present embodiment, it is possible to realize a shorter distance between the pinhole 1 and the last surface of the first optical system. That is, in the first embodiment, the distance between the pinhole 1 and the last surface of the first optical system is 136.1 mm. In contrast, in the second embodiment, 60 mm of such a distance can be shortened while substantially maintaining the same focal length and the optical focusing capability.

TABLE 4

| Surface Number | Radii of Curvature | Intervals | $n_d$ | $V_d$ |
|---|---|---|---|---|
| 11 | ∞ | 56.8 | | |
| 12 | 55.412 | 1 | 1.7552 | 27.511 |
| 13 | 6.101 | *8.7 | | |
| 14 | 59.904 | 3.5 | 1.4875 | 70.235 |
| 15 | −10.454 | * | | |

"*"indicates any random dimension

Figure 3:
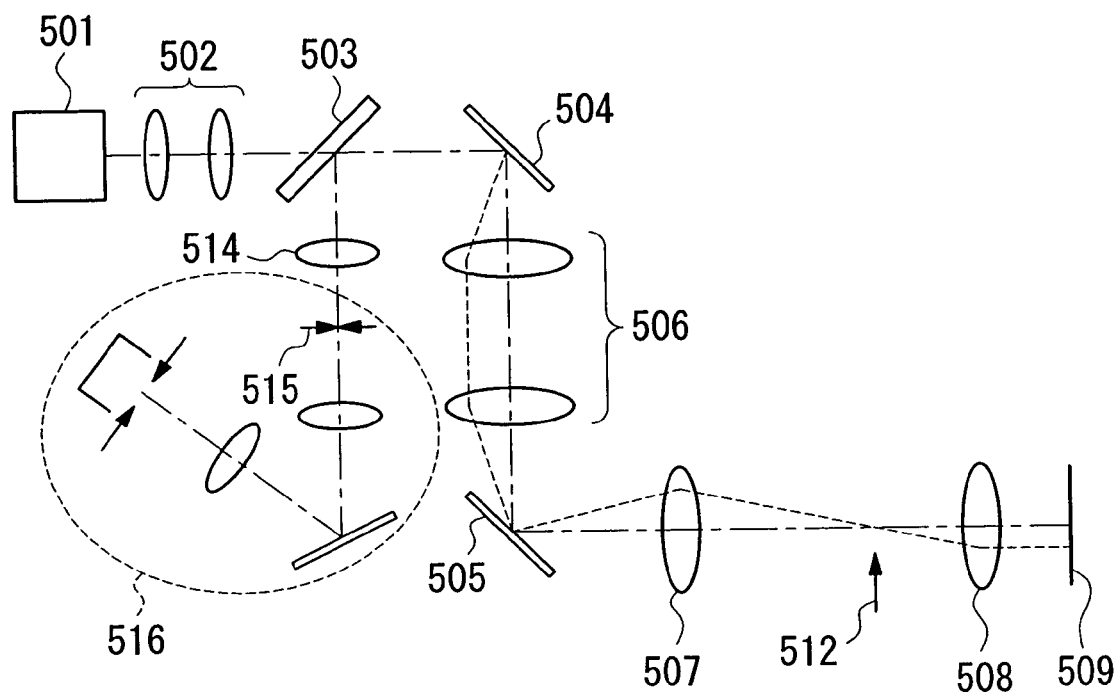
FIG. 3 is a view for showing a general structure for a laser scanning microscope which is provided with a function for dispersing a light according to a third embodiment of the present invention.
Figure 4:
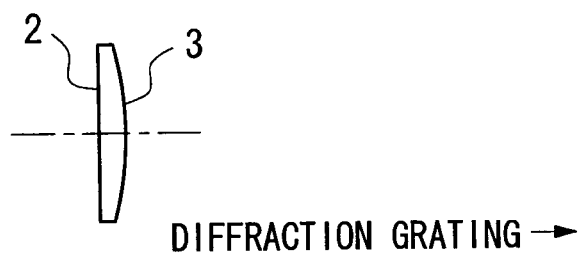
FIG. 4 is a cross section for a first optical system according to a first embodiment of the present invention.

Next, a third embodiment is explained with reference to FIG. 3.

A laser scanning microscope of the third embodiment comprises a light source 501, a beam expander 502, a beam splitter 503, an optical deflectors 504 and 505, a pupil transmitting optical system 506, a pupil projecting optical system 507, an objective lens 508, a sample 509, a confocal lens 514, a confocal pinhole 515, and a spectroscope 516 (a spectroscope which is shown in the first embodiment).

A light which is emitted from the light source 501 is shaped so as to be a light flux with an approximate diameter by the beam expander 502. The light flux is deflected by the optical deflector 504. The deflected light flux passes through the pupil transmitting optical system 506, second optical deflector 505, the pupil projecting optical system 507, and the objective lens 508 so as to be scanned on the sample 509; thus, the sample 509 is excited. A fluorescence which is emitted from the sample 509 progresses on a reverse optical path where the light path comes previously in the optical system; thus, the fluorescence is descanned so as to be incident to the beam splitter 503. A component of the fluorescence which is deflected by the beam splitter 503 is incident to the confocal lens 514 so as to be condensed and pass through the pinhole 1 in the spectroscope 516. The fluorescence which passes through the pinhole 1 is used for a point light source in the spectroscope 516. In the present embodiment, a spectroscope which is explained in the first embodiment is used; thus, it is possible to form a laser scanning microscope which is provided with a function for dispersing a light.

Figure 7:
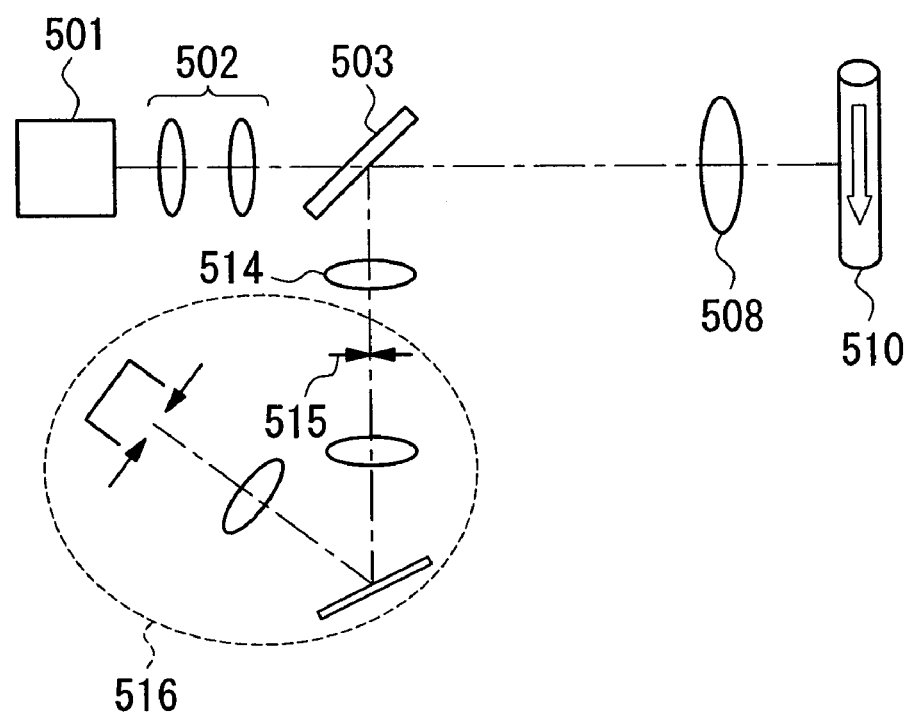
FIG. 7 is a view for showing a structure for a flow cytometer which is provided with a function for dispersing a light according to a fourth embodiment of the present invention.

Next, a fourth embodiment of the present invention is explained with reference to FIG. 7. The laser scanning microscope according to the fourth embodiment is an example in which a sample 510 is used for a flow cytometer.

A light which is emitted from the light source 501 is shaped so as to be a light flux with an appropriate diameter by the beam expander 502 so as to be condensed by the objective lens 508; thus, the condensed light flux is emitted on the sample 510. The sample 510 is treated such that the sample 510 is passed in a fluidic system rapidly in which a cell component such as a cell or a chromosome.

The florescence which is excited by the laser light and emitted from the sample 510 progresses on a reverse optical path where the light path comes previously in the optical system so as to be incident to the beam splitter 503. The fluorescence component which is incident to the beam splitter 503 is deflected and incident to the confocal lens 514 so as to be condensed. The condensed fluorescence component passes through the pinhole 1 of the spectroscope 516. The fluorescence component which passes through the pinhole 1 is used for a point light source in the spectroscope 516. In the present embodiment, the spectroscope which is explained in the first embodiment is used; therefore, it is possible to form a flow cytometer which is provided with a function for dispersing a light.

Figure 8:
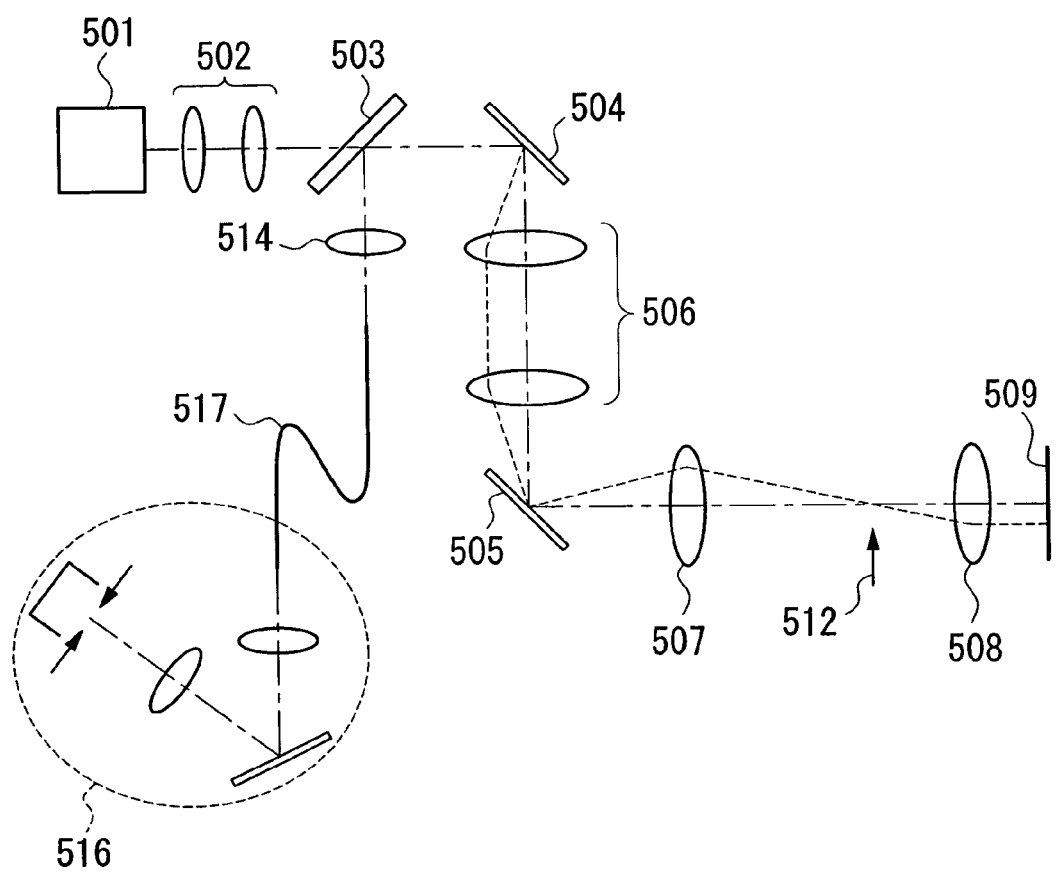
FIG. 8 is view for showing a general structure for a laser scanning microscope which is provided with a function for dispersing a light according to a fifth embodiment of the present invention.

Next, a fifth embodiment of the present invention is explained with reference to FIG. 8.

A laser scanning microscope according to the fifth embodiment is formed so as to be different from the third embodiment in that that the laser scanning microscope of the fifth embodiment is provided with a single mode fiber 517 between the confocal lens 514 and the spectroscope 516. Therefore, an optical performance is the same as that in the third embodiment until the light reaches to the confocal lens 514. The light which is condensed by the confocal lens 514 is incident to an incident end of the single mode fiber; thus, the light which is emitted from an emitting end serves as a point light source for the spectroscope 516.

In the present embodiment, the laser scanning microscope is provided with a single mode fiber 517; therefore, it is possible to determine a relational position of the laser scanning microscope and the spectroscope desirably by changing the length of the single mode fiber 517 variably by disposing the incident end at the condensing position of the confocal lens 514 and disposing the emitting end at the position of the point light source of the spectroscope 516; therefore, it is possible to form the laser scanning microscope having a function for dispersing a light such that it is possible to dispose members desirably.

Figure 9:
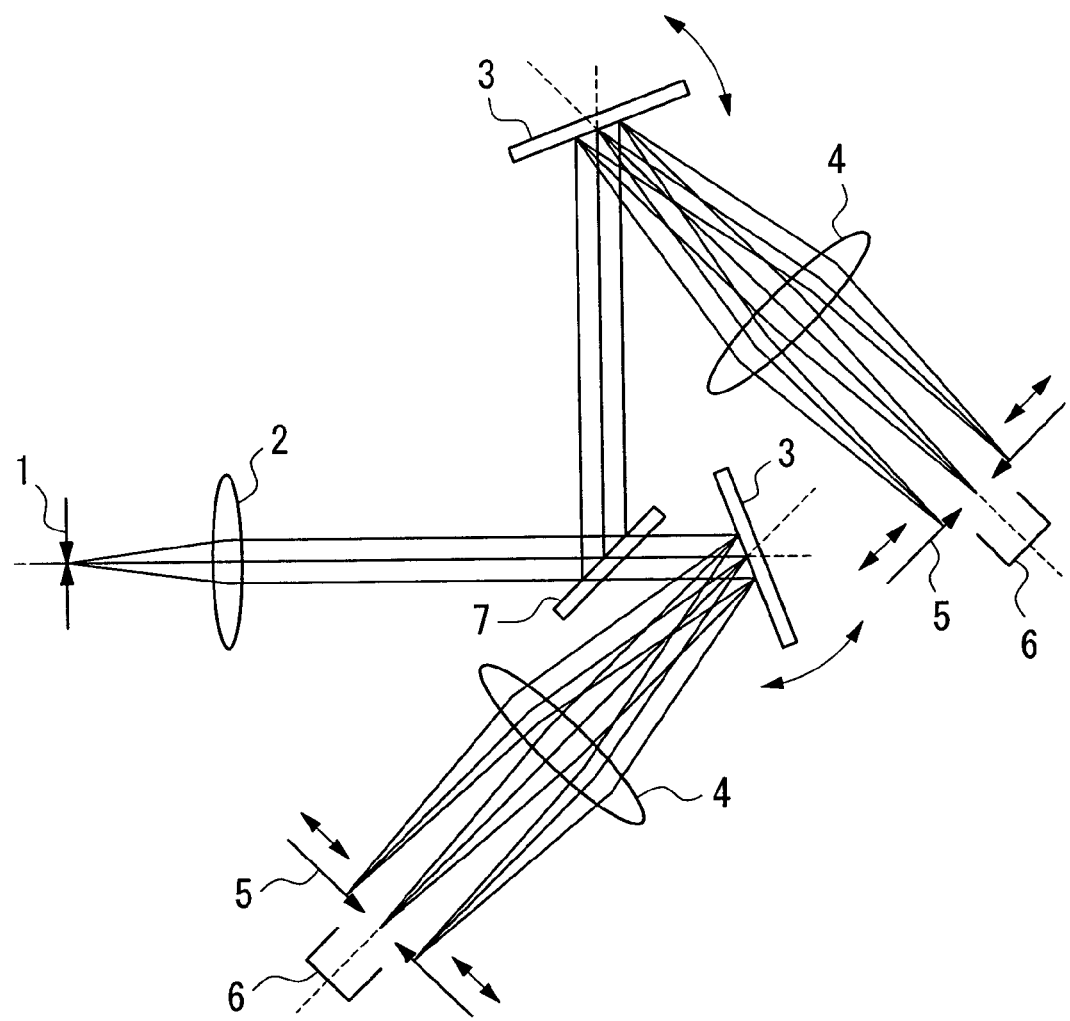
FIG. 9 is a view for showing a structure for a dispersing device according to a sixth embodiment of the present invention.
Figure 10:
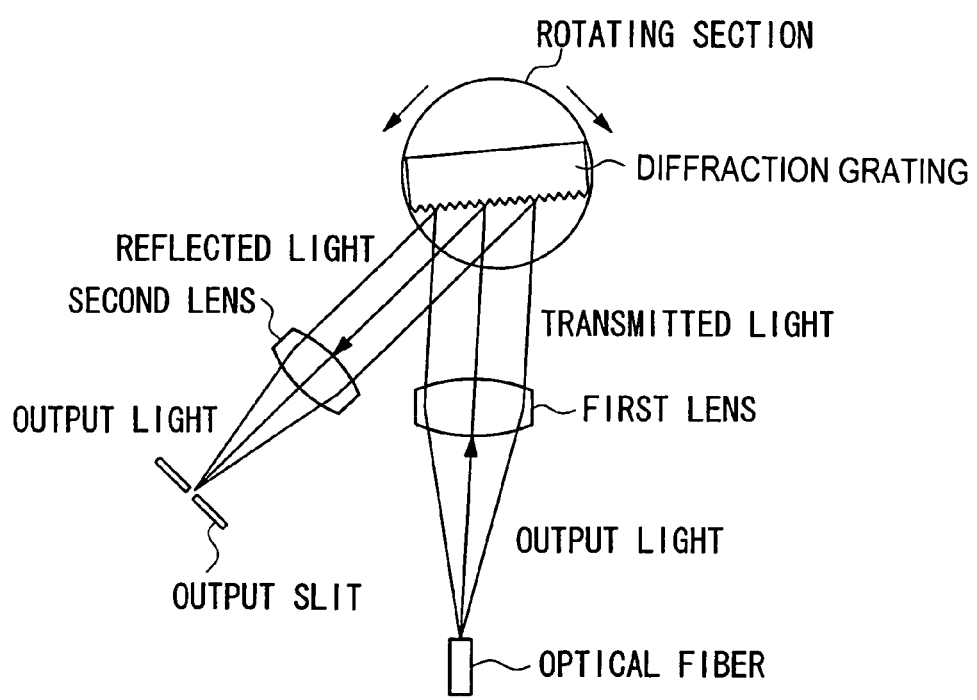
FIG. 10 is a view for showing a structure for a conventional spectroscope.
Figure 11:
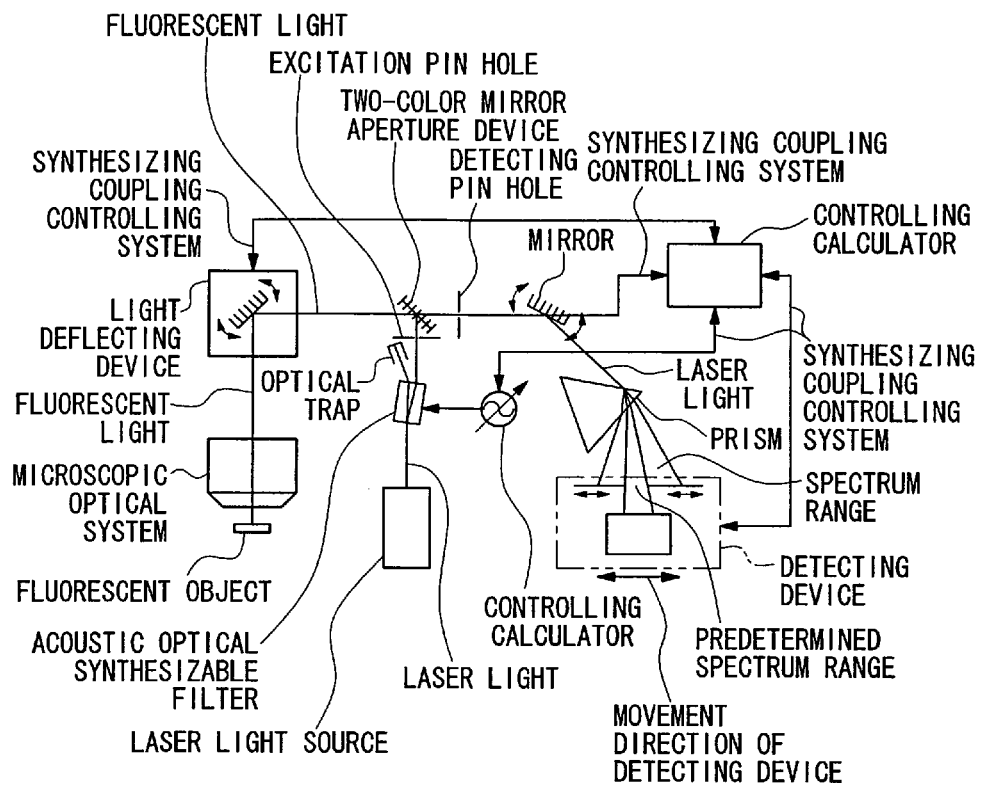
FIG. 11 is a view for showing a structure for a conventional spectrum selecting device.
Figure 12A:
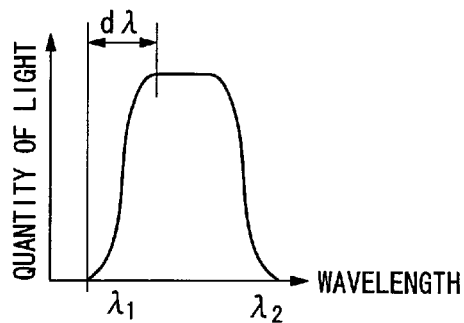
FIGS. 12A and 12B are views for showing quantity of light.
Figure 12B:
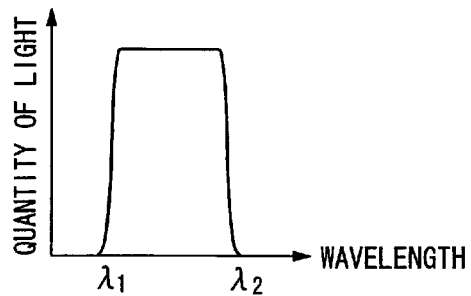

Next, a sixth embodiment of the present invention is explained with reference to FIG. 9. For the sixth embodiment, a two-channel spectroscope is explained. The spectroscope is formed in which at least a beam splitter, a deflecting beam splitter, is disposed between the first optical system 2 and the plane diffraction grating 3 which as shown in FIG. 1 so as to divide a light path. In the present invention, it is possible to use a member which serves for a similar function which is realized by a beam splitter, a deflecting beam splitter. Here, in addition to divided light path, the sixth embodiment has the same structure as the structure shown in FIG. 1 as far as the structure from the plane diffraction grating 3 to the optical detector 6 is concerned. By doing this, it is possible to form a two-channel spectroscope. Here, it is also possible to form a two-channel spectroscope by replacing the spectroscope of the present embodiment by the spectroscope any one of the embodiments 3 to 5.

Specific embodiments therefor have been shown by way of example in the drawings and detailed description. However, it should be understood that the drawings and detailed description thereto are not intended to limit the invention to the particular form disclosed. But on the contrary, it should be understood that the invention is to cover all modifications, equivalents and alternatives falling within the scope of the present invention as defined by the claims. For example, it is explained that the diameter of the pinhole is determined according to the NA and the wavelength of the light in the first embodiment. It may be acceptable to use a pinhole of which diameter is variable by taking various members for forming the optical system into account such that the diameter of the pinhole may be determined desirably.

Also, it is explained that the second optical system is a cemented lens as far as the first embodiment and the TABLE 1 are concerned. However, more importantly, it is acceptable if the second optical system is formed by at least two lenses which are disposed separately from each other as long as the relationship R1 is satisfied. Also, it is explained that the light source for the spectroscope is a pinhole in the fourth embodiment. However, more importantly, it may be acceptable if the light source for the spectroscope is not a pinhole.

As explained above, aberrations for a plurality of wavelengths in non-axial lights are compensated in the second optical system which condenses the lights which are dispersed by the dispersing element. Therefore, it is possible to form a spectroscope which has a variable bandwidth for detecting the wavelength and a high wavelength resolution. Also, in the present invention, the first optical system which collimates the light which is dispersed from the point light source into an approximate parallel light is formed by a lens having a positive focal length and a lens having a negative focal length; therefore, it is possible to form a compact spectroscope which can be assembled easily.

Also, according to the present invention, aberrations for a plurality of wavelengths of an off-axial light flux are compensated in the second optical system. Therefore, it is possible to obtain desirable spots for the $\lambda_1$ and $\lambda_2$ even if the slit width is broadened for detecting the wavelength $\{\lambda|\lambda_1<\lambda<\lambda_2\}$ in one detecting operation. Therefore, by doing this, it is possible to realize a spectroscope with a high wavelength resolution. Here, the emitting end can be various members such as a spot which is condensed by the lens, an aperture (such as a slit or pinhole) which is disposed at a position of the spot, and an end surface of the optical fiber. Alternatively, from a substantial point of view, the emitting end may be a point light source which has a sufficiently small end surface area of the aperture or the optical fiber.

Also, according to the present invention, the second optical system comprises a plurality of lenses. Therefore, by combining these lenses, it is possible to compensate non-axial chromatic aberrations desirably.

Also, according to the present invention, a lens having a positive focal length and a lens having a negative focal length have an Abbe number which satisfies a relationship R1 such as $v_+-v_->25$. Therefore, by combining these lenses, it is possible to form the second optical system which has an apochromat lens. Therefore, it is possible to compensate not only axial chromatic aberrations but also non-axial chromatic aberrations desirably because of an optical characteristic of the apochromat lens.

In the present invention, "a" indicates an incident angle of a light flux which is incident to the reflective plane grating. "N" indicates grooves per a unit length of the reflective plane grating. "m" indicates a diffraction order. "D" indicates a diameter of the light flux which passes through the first optical system.

A relationship R5 such as $$\frac{\Delta\lambda}{\lambda} > \frac{2.44\cos\alpha}{NmD}$$

is satisfied under condition that Δλ indicates a wavelength resolution for separating a light having a wavelength λ from a light having a wavelength (λ+Δλ).

The relationship R5 indicates a condition such that the spot having a condensed wavelength λ and the spot having a wavelength (λ+Δλ) should not overlap each other after the light flux passes through the second optical system under condition that the chromatic aberrations are restricted sufficiently in the second optical system. The right-hand side of the relationship R5 is an index which indicates a wavelength resolution of the spectroscope. On the other hand, the wavelength resolution for an absorption filter which is used for dispersing a fluorescence wavelength (approximately 500 nm) ranges 10 nm to 20 nm in a currently common laser scanning microscopy (LSM) for biology. Therefore, according to the present invention, it is possible to realize a spectroscope which has a wavelength resolution which is similar to that in the absorption filter which is used for a currently common LSM for biology by satisfying the above relationship.

Also, according to the present invention, the first optical system comprises a first lens group having a negative focal length and a second lens group having a positive focal length. By doing this, the first optical system is formed as what is called a telephoto optical system in which a distance between a point light source and the last surface of the lens is shorter than the focal length. Also, under such a condition, the NA for emitting a light from the point light source does not change. Therefore, the entire length of the lens system is shorter than an optical system which has the same focal length while a positioning accuracy is maintained. Therefore, it is possible to form an entire device compactly.

According to the present invention, a spectroscope which has a superior wavelength resolution is used in an optical detecting section which forms the confocal optical system; therefore, it is possible to disperse a light with less noise. For example, it is possible to realize a device which is provided with a flow cytometer for analyzing the characteristics in the cells such as an absolute quantity of the cells and grain size which has a function for dispersing a light by flowing cells which are dyed by a fluorescent color in a narrow water flow and analyzing a fluorescence and a dispersed light by emitting a laser.

According to the present invention, a spectroscope which has a superior wavelength resolution is used in the scanning optical microscope; therefore, it is possible to realize a scanning optical microscope which can perform a detecting operation by selecting the desirable wavelength and detect signals having different wavelength bandwidth from a point.

According to the present invention, it is not necessary to dispose a scanning microscope section and a spectroscope section closely. Therefore, it is possible to realize a scanning optical microscope which has various disposability and a function for dispersing a light.

Δλ indicates a wavelength resolution for separating a light having a wavelength λ from a light having a wavelength (λ+Δλ).

According to the present invention, it is conditioned that the wavelength resolution should be smaller than 20 nm. Therefore, it is possible to realize a device which has a wavelength resolution which is similar to the wavelength resolution in the absorption filter which is used in the currently common LSM for biology.

According to the present invention, Δλ indicates a wavelength resolution for separating a light having a wavelength λ from a light having a wavelength (λ+Δλ). Here, it is conditioned that the wavelength resolution should be smaller than 5 nm; therefore, it is possible to separate two wavelengths which are close to each other more accurately. Therefore, for example, it is possible to use a fluorescent color element which has a close fluorescence wavelength in a device in which an observation is performed by using a fluorescence. That is, it is possible to use more various fluorescent color elements.

What is claimed is:

1. A spectroscope comprising:
    an entrance aperture member for passing light;
    a first optical system for collimating diverging light having passed through the entrance aperture member;
    a rotative spectroscopic element for separating the collimated light into a plurality of light fluxes;
    a second optical system having a plurality of lenses for condensing the light fluxes near a focal plane, at least one of the lenses having a positive focal length and at least one of the lens having a negative focal length;
    a variable-width slit disposed near the focal plane; and
    an optical detector for detecting the light fluxes having passed through the variable-width slit, the light fluxes having different wavelengths corresponding to variation of the slit-width of the variable-width slit and/or the rotation angle of the rotative spectroscopic element, wherein:
    aberrations with respect to the wavelengths of off-axial light fluxes are compensated in the second optical system; and
    a relationship of $v_+ - v_- > 25$ is effective under the condition that: $v_{30}$ indicates an Abbe number for the lens having the positive focal length; and $v_-$ indicates an Abbe number for the lens having the negative focal length.

2. A spectroscope according to claim 1, wherein the rotative spectroscopic element is a reflective plane diffraction grating that satisfies a relationship of $$0 < \frac{2.44 \cos \alpha}{NmD} < 0.04$$

under the condition that α indicates an incident angle of the light flux incident into the reflective plane diffraction grating, N indicates grooves per a unit length, the grooves being formed on the reflective plane diffraction grating, m indicates a diffraction order, and D indicates a diameter of the light flux collimated by the first optical system.

3. A spectroscope according to claim 2, wherein the first optical system comprises a first lens group having a negative focal length and a second lens group having a positive focal length.

4. A spectroscope according to claim 2 wherein
    the optical detector detects the light fluxes having wavelengths selectively by rotating the reflective plane diffraction grating and changing the width of the slit of the variable-width slit.

5. A spectroscope comprising:
    an entrance aperture member for passing light;
    a first optical system for collimating diverging light having passed through the entrance aperture member;
    a non-rotative prism for separating the collimated light into a plurality of light fluxes;
    a second optical system having a plurality of lenses for condensing the light fluxes near a focal plane, at least one of the lenses having a positive focal length and at least one of the lens having a negative focal length;

a variable-width slit disposed near the focal plane; and an optical detector for detecting the light fluxes having passed through the variable-width slit, the light fluxes having different wavelengths corresponding to variation of the slit-width of the variable-width slit, wherein:

aberrations with respect to the wavelengths of off-axial light fluxes are compensated in the second optical system; and a relationship of $v_+ - v_- > 25$ is effective under the condition that: $v_+$ indicates an Abbe number for the lens having the positive focal length; and $v_-$ indicates an Abbe number for the lens having the negative focal length, wherein the optical detector detects the light fluxes having-different wavelengths selectively by changing the slit width of the variable-width slit.

6. A laser scanning microscope comprising:

a light source;

an objective lens for condensing light emitted from the light source on a sample;

a light condensing optical system for condensing the light reflected on the sample or emitted from the sample;

a pinhole disposed near a focal point in the light condensing optical system, the pinhole being optically conjugate with the sample;

a first optical system for collimating the light, having passed through the pinhole and diverging from the pinhole with respect to an optical axis of the first optical system, into approximate parallel light;

a rotative spectroscopic element for separating the collimated light into a plurality of light fluxes;

a second optical system having a plurality of lenses for condensing the separated light fluxes near a focal plane, at least one of the lenses having a positive focal length and at least one of the lens having a negative focal length;

a variable-width slit disposed near the focal plane; and an optical detector for detecting the condensed light fluxes having passed through the variable-width slit, the light fluxes having different wavelengths corresponding to variation of a slit-width of the variable-width slit and/or the rotation angle of the rotative spectroscopic element, wherein:

aberrations for a plurality of wavelengths of an off-axial light flux are compensated in the second optical system; and a relationship of $v_+ - v_- > 25$ is effective under the condition that: $v_+$ indicates an Abbe number for the lens having a positive focal length; and $v_-$ indicates an Abbe number for the lens having a negative focal length.

7. A laser scanning microscope according to claim 6, wherein the rotative spectroscopic element is a reflective plane diffraction grating that satisfies a relationship of $$0 < \frac{2.44\cos\alpha}{NmD} < 0.04$$

under the condition that $\alpha$ indicates an incident angle of a light flux which is incident into the reflective plane diffraction grating, N indicates grooves per a unit length, the grooves being formed on the reflective plane diffraction grating, m indicates a diffraction order, and D indicates a diameter of the light flux collimated by the first optical system.

8. A laser scanning microscope according to claim 7, wherein the first optical system comprises a first lens group having a negative focal length and a second lens group having a positive focal length.

9. A laser scanning microscope according to claim 6, wherein the optical detector detects the light fluxes having wavelengths selectively by rotating the reflective plane diffraction grating and changing the width of the slit of the variable-width slit.

10. A laser scanning microscope according to claim 6, wherein a relationship of $\Delta\lambda < 20$ nm is effective under the condition that $\Delta\lambda$ indicates a wavelength resolution for separating a light having a wavelength $\lambda$ from a light having a wavelength $(\lambda+\Delta\lambda)$.

11. A laser scanning microscope according to claim 6, wherein a relationship of $\Delta\lambda < 5$ nm is effective under condition that $\Delta\lambda$ indicates a wavelength resolution for separating a light having a wavelength $\lambda$ from a light having a wavelength $(\lambda+\Delta\lambda)$.

12. A laser scanning microscope comprising:

a light source;

an objective lens for condensing light emitted from the light source on a sample;

a light condensing optical system for condensing the light reflected on the sample or emitted from the sample;

a pinhole disposed near a focal point in the light condensing optical system, the pinhole being optically conjugate with the sample;

a first optical system for collimating the light, having passed through the pinhole and diverging from the pinhole with respect to an optical axis of the first optical system, into approximate parallel light;

a prism for separating the collimated light into a plurality of light fluxes;

a second optical system having a plurality of lenses for condensing the separated light fluxes near a focal plane, at least one of the lenses having a positive focal length and at least one of the lens having a negative focal length;

a variable-width slit disposed near the focal plane; and an optical detector for detecting the condensed light fluxes having passed through the variable-width slit, the light fluxes having different wavelengths corresponding to variation of a slit-width of the variable-width slit, wherein:

aberrations for a plurality of wavelengths of an off-axial light flux are compensated in the second optical system; and a relationship of $v_+ - v_- > 25$ is effective under the condition that: $v_+$ indicates an Abbe number for the lens having a positive focal length; and $v_-$ indicates an Abbe number for the lens having a negative focal length, wherein the optical detector detects the light fluxes having wavelengths selectively by changing the slit width of the variable-width slit.

13. A laser scanning microscope comprising:

a light source;

an objective lens for condensing light emitted from the light source on a sample;

a light condensing optical system for condensing the light reflected on the sample or emitted from the sample;

a single mode fiber having a light incident end disposed near a focal point in the light condensing optical system, the single mode fiber being optically conjugate with the sample;

a first optical system for collimating the light, having passed through the single mode fiber and diverging from the single mode fiber with respect to an optical axis of the first optical system, into approximate parallel light;

a rotative spectroscopic element for separating the collimated light into a plurality of light fluxes;

a second optical system having a plurality of lenses for condensing the separated light fluxes near a focal plane, at least one of the lenses having a positive focal length and at least one of the lens having a negative focal length;

a variable-width slit disposed near the focal plane; and an optical detector for detecting the condensed light fluxes having passed through the variable-width slit, the light fluxes having different wavelengths corresponding to variation of a slit-width of the variable-width slit and/or the rotation angle of the rotative spectroscopic element, wherein:

aberrations for a plurality of wavelengths of an off-axial light flux are compensated in the second optical system; and a relationship of $v_+ - v_- > 25$ is effective under the condition that: $v_+$ indicates an Abbe number for the lens having a positive focal length; and $v_-$ indicates an Abbe number for the lens having a negative focal length.

14. A confocal optical system comprising:

a laser scanning microscope including:

a light source;

an objective lens for condensing light emitted from the light source on a sample;

a light condensing optical system for condensing the light reflected on the sample or emitted from the sample;

a pinhole disposed at a focal point in the light condensing optical system, the pinhole being optically conjugate with the sample;

a first optical system for collimating the light, having passed through the pinhole and diverging from the pinhole with respect to an optical axis of the first optical system, into approximate parallel light;

a rotative spectroscopic element for separating the collimated light into a plurality of light fluxes;

a second optical system having a plurality of lenses for condensing the separated light fluxes near a focal plane, at least one of the lenses having a positive focal length and at least one of the lens having a negative focal length;

a variable-width slit disposed near the focal plane; and an optical detector for detecting the condensed light fluxes having passed through the variable-width slit, the light fluxes having different wavelengths corresponding to variation of a slit-width of the variable-width slit or the rotation angle of the rotative spectroscopic element, wherein:

aberrations for a plurality of wavelengths of an off-axial light flux are compensated in the second optical system; and a relationship of $v_+ - v_- > 25$ is effective under the condition that: $v_+$ indicates an Abbe number for the lens having a positive focal length; and $v_-$ indicates an Abbe number for the lens having a negative focal length.

* * * * *